United States Patent
Gao et al.

(10) Patent No.: US 11,930,475 B2
(45) Date of Patent: Mar. 12, 2024

(54) GEOGRAPHICAL POSITION BASED TRACKING AREA MANAGEMENT

(71) Applicant: ZTE Corporation, Guangdong (CN)

(72) Inventors: Yuan Gao, Guangdong (CN); He Huang, Guangdong (CN); Jianwu Dou, Guangdong (CN)

(73) Assignee: ZTE Corporation, Guangdong (CN)

( * ) Notice: Subject to any disclaimer, the term of this patent is extended or adjusted under 35 U.S.C. 154(b) by 434 days.

(21) Appl. No.: 17/211,531

(22) Filed: Mar. 24, 2021

(65) Prior Publication Data
US 2021/0212014 A1 Jul. 8, 2021

Related U.S. Application Data

(63) Continuation of application No. PCT/CN2018/108050, filed on Sep. 27, 2018.

(51) Int. Cl.
*H04W 64/00* (2009.01)
*H04W 8/02* (2009.01)
*H04W 84/04* (2009.01)

(52) U.S. Cl.
CPC ............ *H04W 64/00* (2013.01); *H04W 8/02* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2008/0102896 A1* | 5/2008 | Wang | H04W 60/04 455/560 |
| 2014/0378137 A1 | 12/2014 | Olofsson et al. | |
| 2016/0057661 A1 | 2/2016 | Nayak et al. | |
| 2017/0295536 A1 | 10/2017 | Kim et al. | |
| 2018/0352074 A1* | 12/2018 | Swartz | H04M 1/72463 |

FOREIGN PATENT DOCUMENTS

| | | |
|---|---|---|
| CN | 101415171 A | 4/2009 |
| CN | 101754186 A | 6/2010 |

OTHER PUBLICATIONS

Article 71(3) EPC, Intention for Grant for co-pending EP 18929841. 7, dated Jun. 5, 2023, 9 pages.
International Search Report and Written Opinion in International Application No. PCT/CN2018/108050, dated Jun. 27, 2019, 6 pages.
Extended European Search Report for EP 18929841.7, dated Sep. 23, 2021, 12 pages.
3GPP, "Technical Specification Group Radio Access Network; Solutions for NR to support non-terrestrial networks (NTN)" 3GPP TR 38.821 V0.1.0 (Sep. 2018), 18 pages.

(Continued)

*Primary Examiner* — Frantz Bataille
(74) *Attorney, Agent, or Firm* — Perkins Coie LLP

(57) ABSTRACT

A wireless terminal determines a tracking area code (TAC) from a geographic position of the wireless terminal. From the TAC, the wireless terminal determines the tracking area identity based on an indication from the network-side regarding whether or not geographic position based tracking area identity determination is to be used or not. In some implementations, the network-side is a satellite cell that is configured to provide wireless connectivity to the wireless terminal.

20 Claims, 14 Drawing Sheets

(56) References Cited

OTHER PUBLICATIONS

ZTE Corporation, et al. "Tracking area management in NTN," 3GPP TSG-RAN WG2 Meeting #105bis Xi'an, China, Apr. 8-12, 2019, R2-1903622 (Revision of: R2-1900829), 11 pages.

Huawei, "TAI in 5GC," 3GPP TSG CT WG4 Meeting #86, West Palm Beach, US Aug. 20-24, 2018, C4-186330, 8 pages.

Thales, et al. "NR-NTN: solution principles for NR to support non-terrestrial networks Discussion," 3GPP TSG RAN1 Meeting #93, Busan, Korea, May 21-May 25, 2018, R1-1807864, 12 pages.

\* cited by examiner

GEOGRAPHICAL POSITION BASED TRACKING AREA MANAGEMENT

CROSS-REFERENCE TO RELATED APPLICATIONS

This application is a continuation of International Patent Application No. PCT/CN2018/108050, filed on Sep. 27, 2018, the contents of which are incorporated herein by reference in their entirety.

TECHNICAL FIELD

The present document relates to wireless communications.

BACKGROUND

The integration of satellite networks and terrestrial mobile networks is a new trend in satellite communication. The effective use of cellular networks, their functional entities, signaling procedures and interfaces in satellite networks is an important part of NTN (non-terrestrial network) development. It is conducive to the effective integration and unified management of satellite networks and terrestrial networks. The Tracking Area (TA) is a concept established by the terrestrial mobile network for terminal location management. When the terminal is in the idle state, the core network can know the TA where the terminal is located. When the terminal in the idle state needs to be paged, network send paging message in all cells with the TA known in the RA (Registration Area).

SUMMARY

The present document describes techniques that can be used in various embodiments for managing tracking area based on geographic positioning.

In one example aspect, a method of wireless communication is disclosed. The method includes determining, by a wireless terminal, a tracking area code (TAC) from a geographic position of the wireless terminal, and determining a tracking area identity (TAI) of the wireless terminal based on the tracking area code and an indicator received from a network-side device.

In another example aspect, another method of wireless communication is disclosed. The method includes transmitting, by a network-side device, a control message indicating that a non-terrestrial network (NTN) in which a tracking area identifier is determined by using a tracking area code based on a geographic position of a wireless terminal.

In yet another example aspect, another method of wireless communication is disclosed. The method includes receiving, at a wireless terminal, a control message indicating that a non-terrestrial network in which a tracking area identifier is determined by using a tracking area code based on a geographic position of the wireless terminal, and performing mobility operation based on the control message.

In yet another aspect, one or more of the above-described methods may be implemented by a wireless communications apparatus that includes a processor.

In yet another aspect, the above-described methods may be embodied as processor-executable code and stored on a computer readable medium.

These, and other, features are described in the present document.

BRIEF DESCRIPTION OF THE DRAWINGS

FIG. 3 shows an example format for a tracking area code value.

FIG. 6 shows an example of lattice indices for covering the earth.

DETAILED DESCRIPTION

In wireless communication, user equipment (UEs) or wireless terminals are often mobile. During operation, therefore, a wireless terminal may be present in any of the several cell areas being served by a network. Therefore, a mechanism is needed so that the network can reach a wireless terminal for delivering a message such as a paging message. One such mechanism uses the concept of tracking area(s) for the wireless terminal.

The present application discloses techniques that may be used by wireless terminals and network-side devices to extend the tracking area mechanism to non-terrestrial wireless networks (NTN) in which a satellite cell provides wireless connectivity to UEs.

Figure 14:
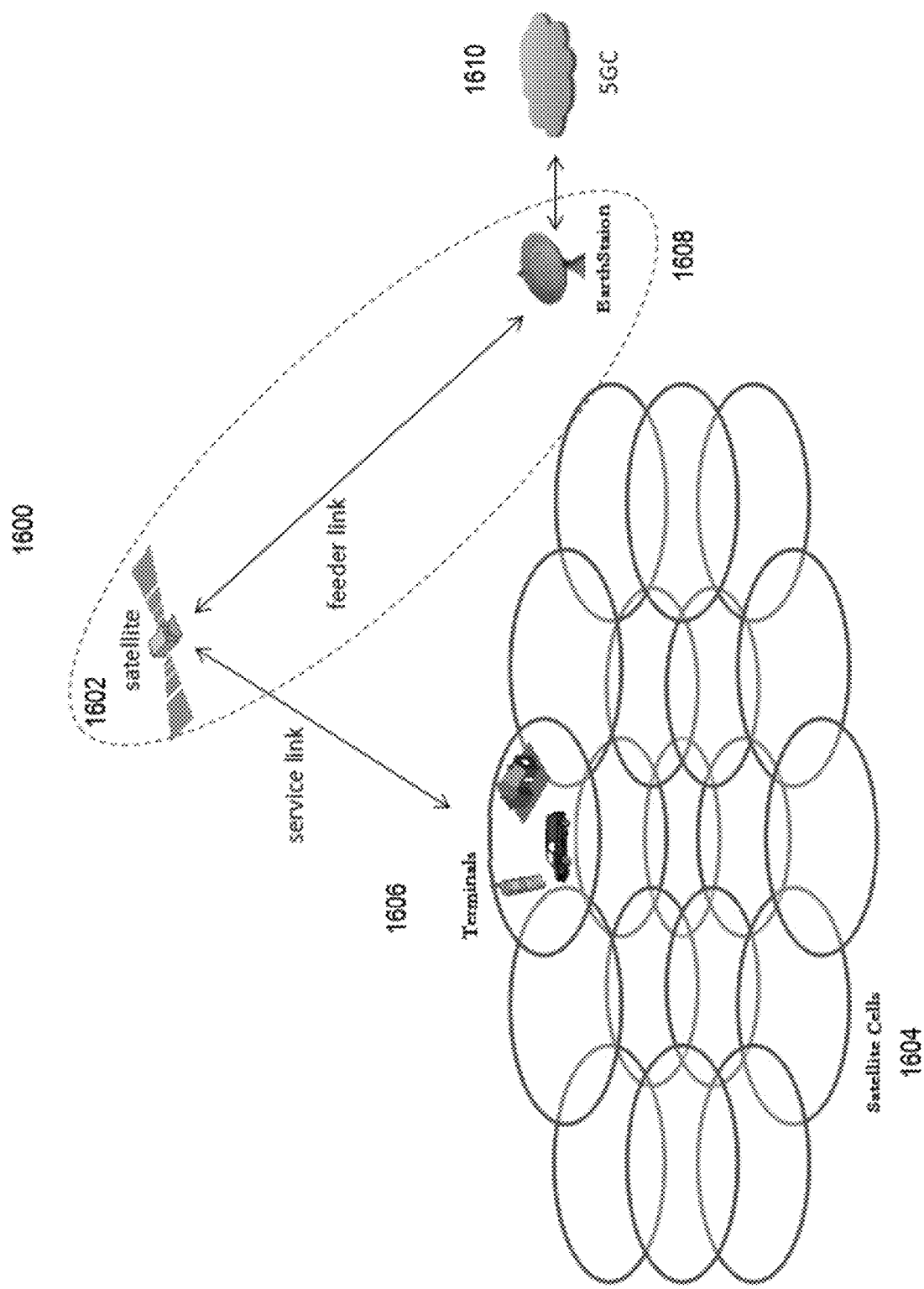
FIG. 14 shows an example of a non-terrestrial network.

One example of an NTN is shown in FIG. 14, which shows an example wireless communications network 1600 that includes NTN. The network 1600 includes a base station BS satellite 1602 and multiple user devices 1606 being able to communicate with each other over a transmission medium 1604 with the satellite 1602 via a wireless service link. The terminals 1606 may be operating in the network 1600 that includes one or more satellite cells 1604 with their corresponding coverage footprints. The satellite 1602 may be communicatively connected with an earth station 1608 via a feeder link. The feeder link may carry messages to/from the terminals 1606 being served by the satellite 1602. The earth station 1608 may be communicatively connected with a core wireless network such as a 5G core network 1610. Accordingly, messages to the terminals 1606 from the 5GC network may travel over the earth station to the satellite, and then from the satellite to the terminal. Similarly, messages from the terminal may travel over the service link to the satellite, then from the satellite over feeder link to the earth station, and then from the earth station to the 5GC network. The satellite 1602 and the wireless terminals 1606 may be configured to implement techniques described in the present document.

BRIEF INTRODUCTION

In the upcoming 5G standard for New Radio (NR) technology being finalized by the 3GPP group, sometimes also called Next Generation or NG standard, when a UE registers with the network over the 3GPP access, a network-side function called Access and Mobility Function (AMF) allocates a set of tracking areas in a tracking area identifier (TAI) List to the UE to identify the registration area. When downlink data arrives for UEs in CM-IDLE or CM-REGISTERED state, the AMF will send a PAGING message to all the NG-RAN (Next Generation Radio Access Network) nodes within the registration areas via NG interface. Then the NG-RAN node will send a Paging message via Uu interface to the UE. Upon receiving the Paging message, UE triggers RRC (radio resource control) connection setup procedure for data transmission.

Figure 1:
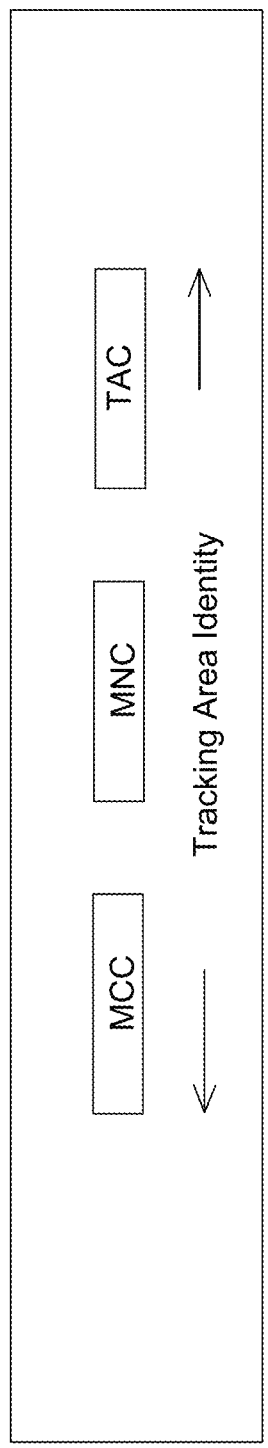
FIG. 1 shows an example format used for an example of Tracking Area Identity (TAI).

In NR, the TAI consists of a Mobile Country Code (MCC), Mobile Network Code (MNC), and Tracking Area Code (TAC). As shown in FIG. 1, the TAI is composed of the following elements:

MCC identifies the country in which the public land mobile network (PLMN) is located. The value of the MCC is the same as the three digit MCC contained in the International Mobile Subscriber Identity (IMSI).

MNC is a code identifying the PLMN in that country. The value of the MNC is the same as the two or three digit MNC contained in the IMSI.

TAC is a fixed length code (of 3 octets) identifying a Tracking Area within a PLMN. When UE moves to a new cell, the PLMN ID (MCC+MNC) and TAC value will be acquired via broadcast system information of that cell. If the TAI received from the newly camped cell does not belong to the previously configured TAI list, a Mobility Registration Update will be triggered by the UE and updated TAI lists will be sent to UE to make the UE reachable.

While the various techniques and embodiments in the present document are described with reference to the 5G protocol, the disclosed techniques are not limited to use within 5G networks and may be practiced in other wireless systems. Section headings are used in the present document for the ease of understanding and do not limit the scope of embodiments and techniques in each section to only that section.

(1) Examples of Using Tracking Area in NTN

In NTN, the tracking area will also be defined to make UEs reachable within the registration area (i.e. a list of tracking areas). But the tracking area can be managed in a different way from NR. In this patent document, we disclose techniques that may be used by various implementations to manage the tracking area based on geographical positions.

In some disclosed embodiments, the TAI is determined based on geographical positions. In some embodiments, an indication is introduced in Radio Resource Control (RRC) signaling, which is a communication signal at a higher layer than media access control (MAC) layer in wireless protocols. For example, in some embodiments, the indicator can be included in PLMN info or as a separate IE in system information block 1 (SIB1) or master information block (MIB), to indicate the non-terrestrial network in which geographical position based TAC management is applied. In some embodiments, the UE derives the TAI based on the TAC mapped from the geographical area in which the UE tries to camp and the broadcast PLMN ID to determine whether to trigger Mobility Registration Update procedure.

Examples of TAI Determination Based on Geographical Positions.

The TAC (Tracking Area Code) field in TAI is derived based on geographical positions. The longitude and latitude of the geographical area within a certain range may be mapped to a TAC.

Method 1:

In this method, the TAC is divided into at least two partitions. One partition of TAC indicates the longitude while another partition indicates the latitude of the geographical area.

Implementation Example 1.1

Figure 2:
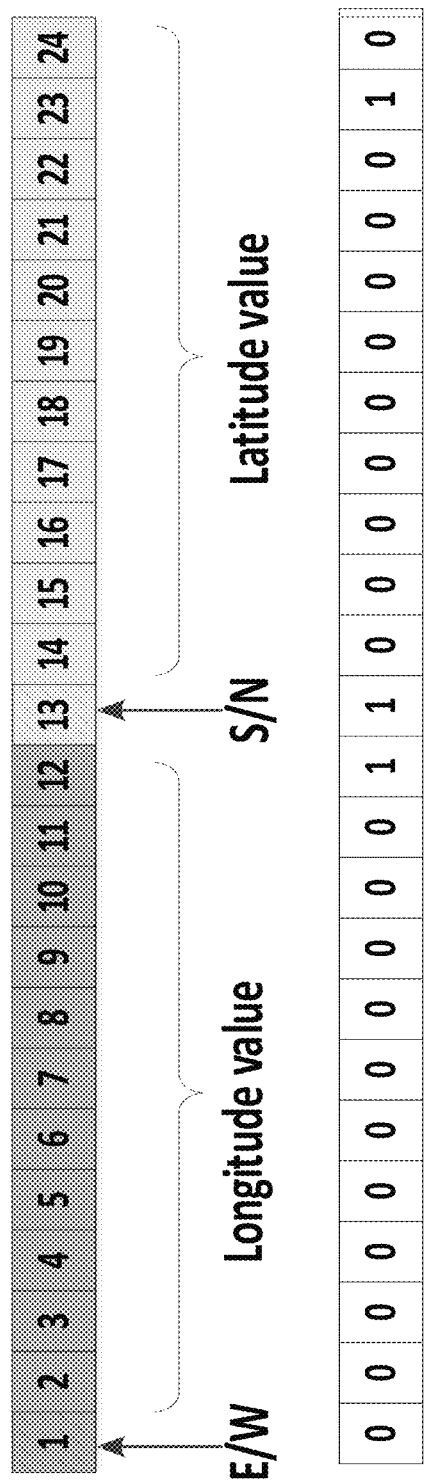
FIG. 2 shows an example format for a tracking area code value.

FIG. 2 shows an example format of the TAC field. The size of TAC is 24 bits. The 12 MSB (most significant bits) in TAC indicate the longitude while the 12 LSB (least significant bits) indicate the latitude of the geographical location. All the bits in TAC field are used. The earth is divided in to 4096*4096 pieces.

For the longitude part in TAC (i.e. 12 MSB), the first MSB (MSB 1) indicates whether it is the east longitude or the west longitude (e.g. 0 indicates east while 1 indicate west). The remaining 11 bits indicate the longitude value.

For the latitude part in TAC (i.e. 12 LSB), the first MSB (MSB 1) indicates whether it is the south latitude or the north latitude (e.g. 0 indicates south while 1 indicates north). The remaining 11 bits indicate the latitude value. Alternatively, other pre-defined position in the field may be used for the east/west or north/south directionality indication.

For example, for the TAC value is 000000000001100000000010, the TAC can be interpreted as:

[0° 5'16"E, 0° 5'16" N] which identify the geographical area from 0° 5'16"E to E and 0° 5'16" N to 0° 7'55"N.

Implementation Example 1.2

Figure 3:
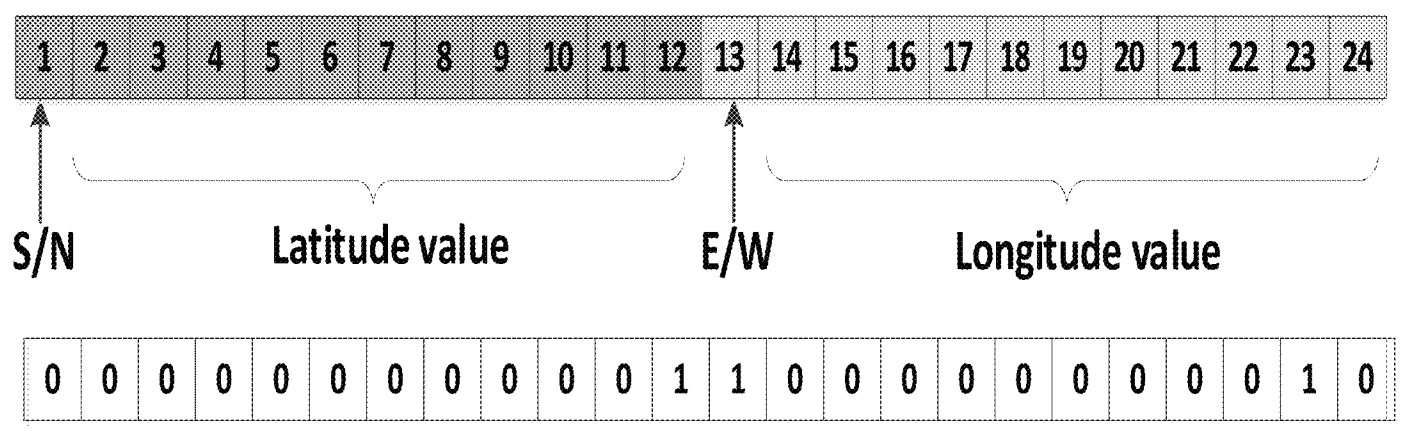

As shown in FIG. 3, The size of TAC is 24 bits. The 12 LSB in TAC indicate the longitude while the 12 MSB indicate the latitude of the geographical area. All the bits in TAC field is used. The earth is divided in to 4096*4096 pieces.

For the longitude part in TAC (i.e. 12 LSB), the first MSB (bit 13) in this partition indicates whether it is the east longitude or the west longitude (e.g. 0 indicates east while 1 indicate west). The remaining 11 bits indicate the longitude value.

For the latitude part in TAC (i.e. 12 MSB), the first MSB (bit 1) in this partition indicates whether it is the south latitude or the north latitude (e.g. 0 indicates south while 1 indicates north). The remaining 11 bits indicate the latitude value.

For example, if the TAC value is 000000000001100000000010, the TAC can be interpreted as:

[0° 10'34" W, 0° 2'38" S] which identify the geographical area from 0° 10'34" W to and 0° 2'38" S to 0° 5'17"S.

Implementation Example 1.3

Figure 4:
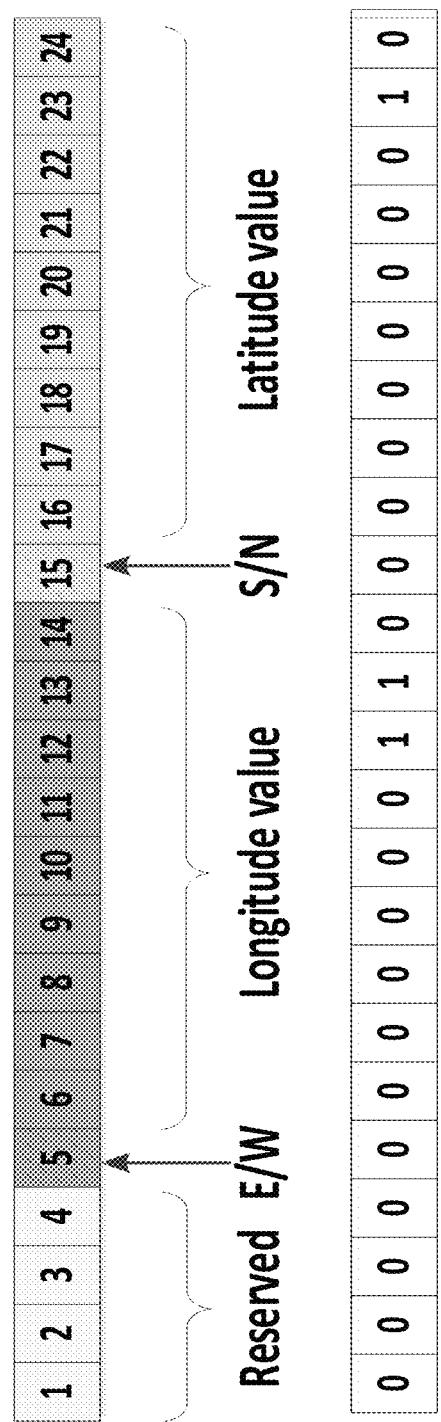
FIG. 4 shows an example format for a tracking area code value.

As shown in FIG. 4, the size of TAC is 24 bits. The 20 LSB in TAC indicate the geographical area while the 4 MSB are reserved. For the geographical area part in TAC, the 10

LSB indicate the longitude while the 10 MSB indicate the latitude of the geographical area. The earth is divided in to 1024*1024 pieces.

For the longitude part in TAC (i.e. 10 LSB of the geographical area part), the 1 MSB (bit 5) in this partition indicates whether it is the east longitude or the west longitude (e.g. 0 indicates east while 1 indicate west). The remaining 9 bits indicate the longitude value.

For the latitude part in TAC (i.e. 10 MSB of the geographical area part), the 1 MSB (bit 15) in this partition indicates whether it is the south latitude or the north latitude (e.g. 0 indicates south while 1 indicates north). The remaining 9 bits indicate the latitude value.

For example, if the TAC value is 00000000001100000000010, the TAC can be interpreted as:

[2° 6'32" E, 0° 21'7" S] which identify the geographical area from 2° 6'32" E to 2° 27'40" and 0° 21'7" S to 0° 31'37" S.

Implementation Example 1.4

Figure 5:
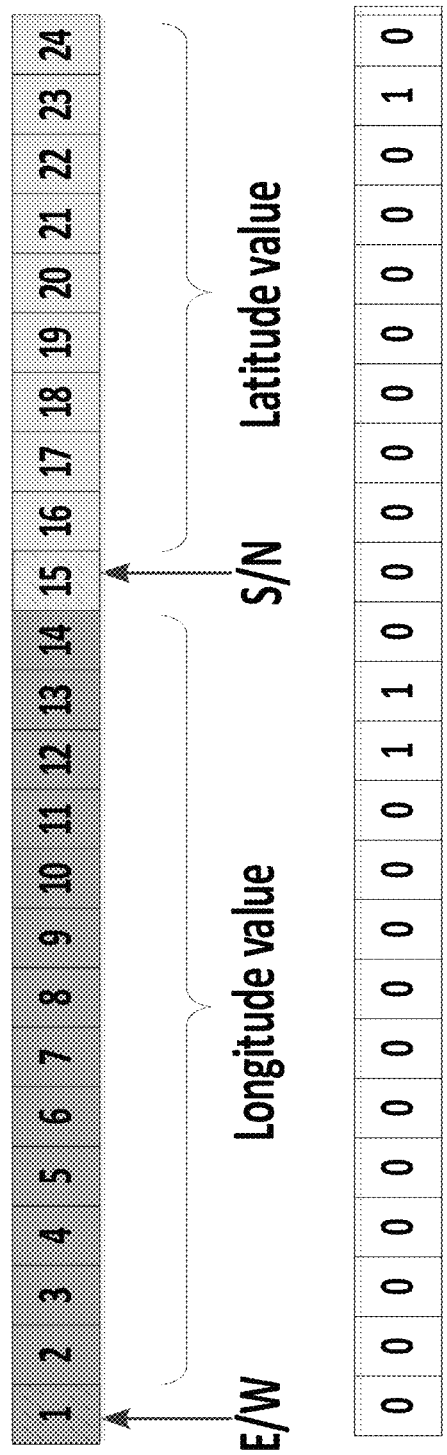
FIG. 5 shows an example format for a tracking area code value.

As shown in FIG. 5, the size of TAC is 24 bits. The 14 MSB in TAC indicate the longitude while the 10 LSB indicate the latitude of the geographical area. All the bits in TAC field is used. The earth is divided in to 16384*1024 pieces.

For the longitude part in TAC (i.e. 14 MSB), the 1 MSB (bit 1) indicates whether it is the east longitude or the west longitude (e.g. 0 indicates east while 1 indicate west). The remaining 13 bits indicate the longitude value.

For the latitude part in TAC (i.e. 10 LSB), the 1 MSB (bit 15) indicates whether it is the south latitude or the north latitude (e.g. 0 indicates south while 1 indicates north). The remaining 9 bits indicate the latitude value.

For example, if the TAC value is 00000000000001100000000010, the TAC can be interpreted as:

[0° 7'55" E, 0° 21'7" S] which identify the geographical area from 0° 7'55" E to 0° 9'14" and 0° 21'7" S to 0° 31'37" S.

Therefore, as described in the above examples, the TAC field is partitioned into at least two partitions—one for representing latitude and one for representing longitude. These partitions may be equal in size or different. One bit position within each partition may be reserved to indicate east/west indication. This bit may be the MSB of the field or another pre-known bit. The TAC field may include a third partition of reserved bits for future use.

Method 2:

In this method, the geographical area of the whole earth is partitioned according to the longitude and latitude into a lot of lattices. The TAC value indicates the index of a certain lattice. Each lattice therefore represents a two-dimensional surface area of the earth. The lattices may be selected to have same areas, or in some cases, lattices may be favored to accommodate larger density of UEs in dense population area by making the lattices finer in granularity in these areas.

Implementation Example 2.1

Figure 6:
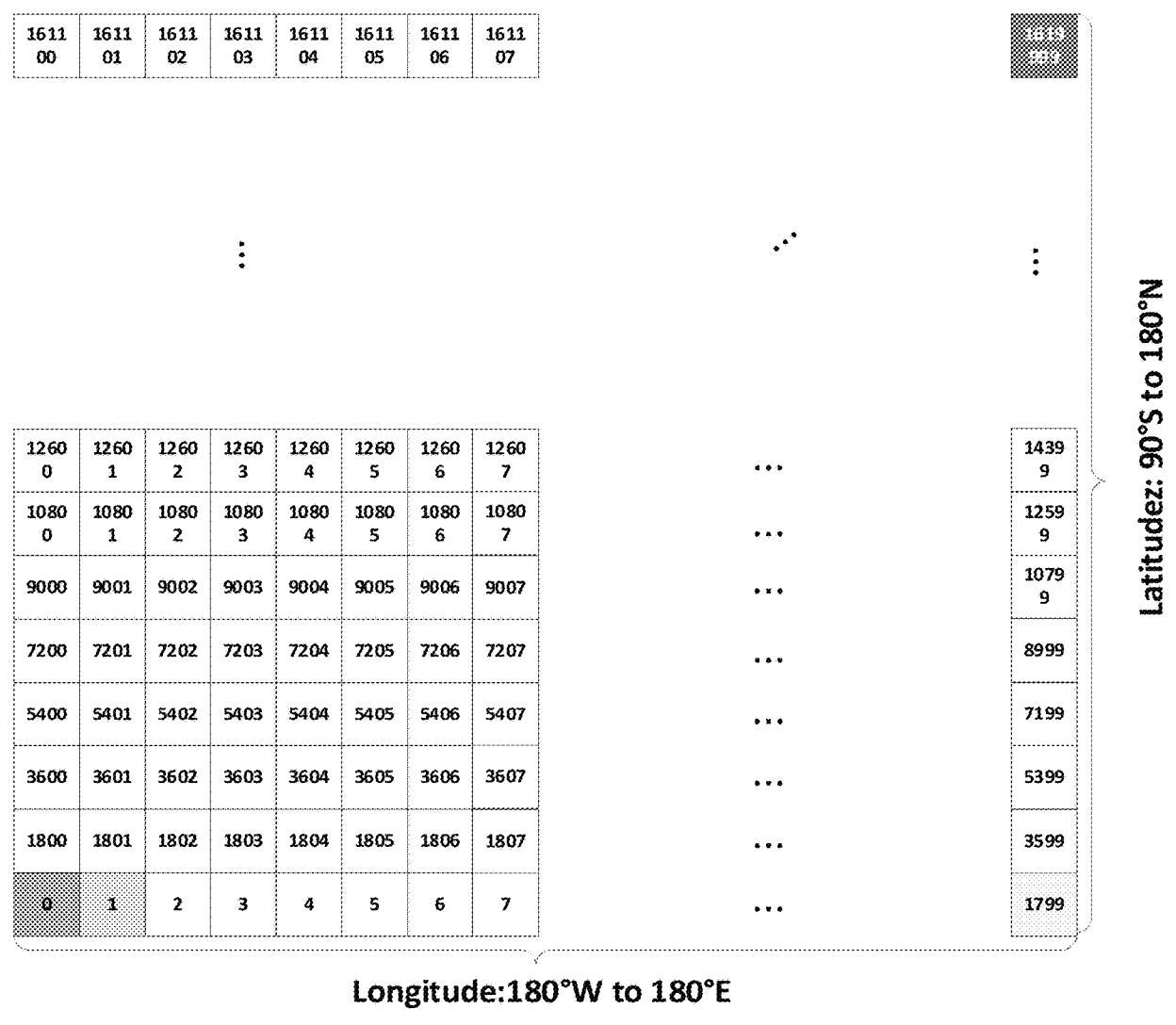

As show in FIG. 6, the geographical area of the whole earth is partitioned by the longitude and latitude into 16200000 lattices. Each lattice represents a certain geographical area which covers 0.2 (i.e. 0° 12') in longitude and 0.2 in latitude. The table for the lattices that defines the relationship between lattice index and a corresponding longitude/latitude grid can be:

defined in the protocols and stored in UE side, or
configured to UE though AS/NAS or higher layer signaling, or
generated by UE according to pre-defined rules.

As shown in FIG. 6, each geographical area which covers 0.2 (i.e. 0° 12') in longitude and 0.2 in latitude is mapped to an index. Some examples are given as follows to help understand the mapping rule.

[180° W-179° 48' W, 90° S-89° 48'S]:
index 0, TAC:000000000000000000000000;
[179° 48' W-179° 36' W, 90° S-89° 48'S]:
index 1, TAC:000000000000000000000001;
[179° 48' E-180° E, 90° S-89° 48'S]:
index 1799, TAC:000000000000011100000111;
[179° 48' E-180° E, 89° 48'N-90° N]: index 161999, TAC: 000000100111100011001111.

Implementation Example 2.2

The geographical area of the whole earth is partitioned by the longitude and latitude into 71856 lattices. Each lattice represents a certain geographical area which covers 0.2*0.2, 1*1, 2*2, 5*5, 10*10 in longitude and latitude. The table for the lattices can be:

defined in the protocols and stored in UE side, or
configured to UE though AS/NAS or higher layer signaling, or
generated by UE according to pre-defined rules.

Figure 7:
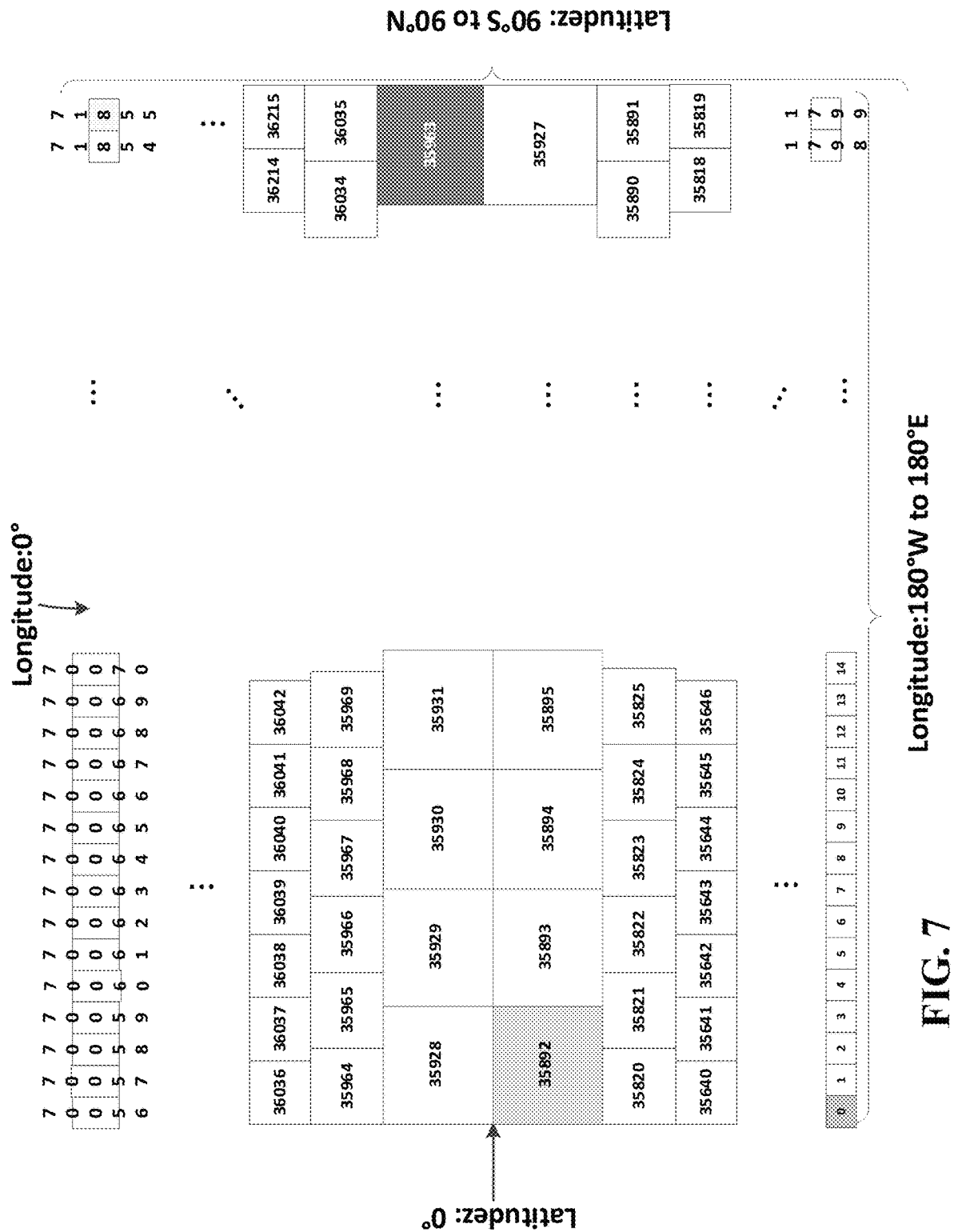
FIG. 7 shows an example of lattice indices for covering the earth.

As shown in FIG. 7, each geographical area which covers 0.2*0.2, 0.5*0.5, 1*1, 2*2, 10*10 in longitude and latitude is mapped to an index. Some examples are given as follows to help understand the mapping rule.

[180° W-179° 48' W, 90° S-89° 48'S]:
index 0, TAC:000000000000000000000000;
[180° W-170° W, 10° S-0° S]:
index 35892, TAC:000000001000110000110100;
[170° E-180° E, 0° N-10° N]:
index 35963, TAC:000000001000110001111011;
[179° 48' E-180° E, 89° 48'N-90° N]:
index 71855, TAC: 000000010001100010101111.

Method 3:

In some embodiments, with the longitude and latitude as inputs, the TAC value can be calculated based on a specified formula.

Implementation Example 3.1

Figure 8:
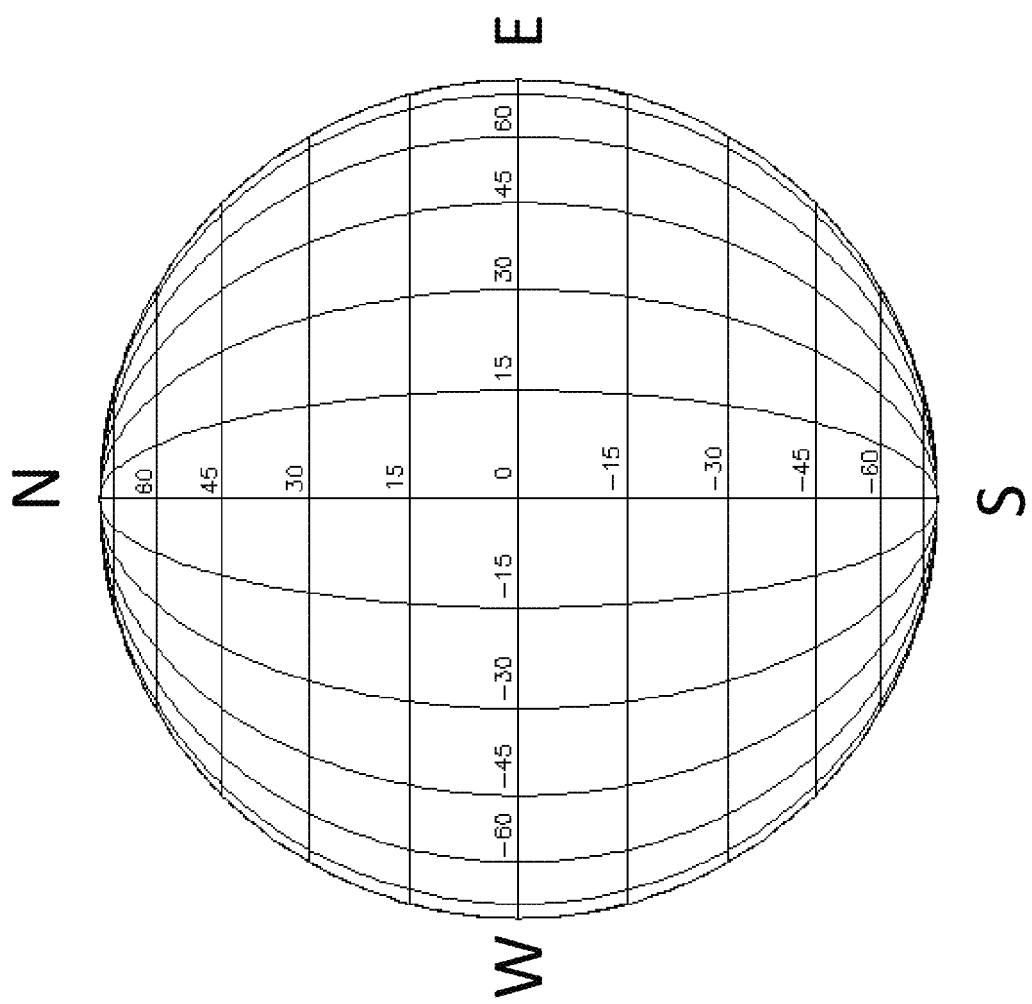
FIG. 8 shows an example of numerical assignment of longitude and latitude values to cover earth's surface.

Since negative values can be used to indicate the west longitude and south latitude. The value range for longitude and latitude can be −180 to +180 and −90 to +90, respectively. FIG. 8 shows an example of division of earth in longitudes and latitudes that span the negative to positive range.

The TAC value mapped to a geographical area can be calculated based on the following formula:

TAC=floor((the longitude value+180)*5)+ 360*5*floor((the latitude value+90)*5).

For example, the TAC value for [179° 48' E, 90° S] can be calculated as:

TAC=floor((+179.8+180)*5)+360*5*floor ((−90+90)*5)=1799.

(2) Indicating NTN in RRC Message

An indication is introduced in RRC message to indicate a "NTN" system in which the geographical location-based TAC management is applied. The indication can be introduced in PLMN ID field or in a system information block 1 (SIB1)/master information block (MIB) message directly instead of the TAI (e.g. not as part of TAI).

Example Embodiments

An indication is introduced in PLMN ID field in TAI or in system information block 1 (SIB1)/master information block (MIB) message to indicate a "NTN" system in which the geographical location based TAC management is applied.

Method 1:

Implicit indication: Specific values of PLMN ID are reserved only for "NTN" system in which the geographical location based TAC management is applied.

Implementation Example 1

PLMN ID values 000 000 or 999 999 have not been used in the existing communication systems. Such unused values can be used to indicate a "NTN" system in which the TA management is based on geographical positions and the TAC value is mapped to certain geographical area.

Method 2:

Explicit indication: Some embodiments may add a separate IE in a master information block (MIB)/system information block 1 (SIB1) message to indicate a "NTN" system in which the geographical location based TAC management is applied.

Implementation Example 2

Add a separate IE in a master information block (MIB)/system information block (SIB1) message to indicate a "NTN" system in which the geographical location based TAC management is applied.

For example, connectToNTN can be added in a master information block (MIB)/system information block 1 (SIB1) message and broadcast to UE to indicate an "NTN" system.

connectToNTN ENUMERATED {true} OPTIONAL, —Need R

A per-frequency/per-carrier indication is introduced in system information to indicate whether a neighbor frequency/carrier is a non-terrestrial network frequency/carrier or not.

Example Embodiments

Method 1:

A per-frequency/per-carrier indication is introduced in system information to indicate whether a neighbor frequency/carrier is a non-terrestrial network frequency/carrier or not. UE performs inter-frequency cell reselection based on such indication to re-select to a frequency/carrier supporting the non-terrestrial network or a frequency/carrier not supporting non-terrestrial network.

Implementation Example 1

A per-frequency/per-carrier indication is introduced in system information block 4 (SIB4) to indicate whether a neighbor frequency/carrier is a non-terrestrial network frequency/carrier or not. UE performs inter-frequency cell reselection based on such indication to re-select to a frequency/carrier supporting non-terrestrial network or a frequency/carrier not supporting non-terrestrial network.

For example, supportingNTN information can be added per frequency/carrier in system information block 4 (SIB4). This information may be broadcast to UE as assistance information for cell reselection. Upon receiving this information, the UE performs an inter-frequency cell reselection based on such indication to re-select to a frequency/carrier supporting non-terrestrial network. Alternatively, the UE may perform re-selection of a frequency/carrier not supporting non-terrestrial network.

Table 1 shows a pseudo-code example in ASN1 format for a system information block 4 (SIB4) that may be broadcast to the UE.

TABLE 1

```
-- ASN1START
-- TAG-SIB4-START
SIB4 ::=            SEQUENCE {
    interFreqCarrierFreqList        InterFreqCarrierFreqList,
    lateNonCriticalExtension        OCTET STRING        OPTIONAL,
    ...
}
InterFreqCarrierFreqList ::=        SEQUENCE (SIZE (1..maxFreq)) OF InterFreqCarrierFreqInfo
InterFreqCarrierFreqInfo ::=        SEQUENCE {
    supportingNTN           ENUMERATED {true}           OPTIONAL, -- Need R
    dl-CarrierFreq          ARFCN-ValueNR,
    frequencyBandList       MultiFrequencyBandListNR-SIB    OPTIONAL,   -- Need R
    frequencyBandListSUL    MultiFrequencyBandListNR-SIB    OPTIONAL,   -- Need R
    nrofSS-BlocksToAverage        INTEGER (2..maxNrofSS-BlocksToAverage)   OPTIONAL,
    absThreshSS-BlocksConsolidation ThresholdNR                         OPTIONAL,
    smtc                    SSB-MTC                         OPTIONAL,   -- Need R
    ssbSubcarrierSpacing    SubcarrierSpacing,
    ssb-ToMeasure           SSB-ToMeasure                   OPTIONAL,   -- Need R
    deriveSSB-IndexFromCell     BOOLEAN,
    ss-RSSI-Measurement         SS-RSSI-Measurement         OPTIONAL,
    q-RxLevMin              Q-RxLevMin,
    q-RxLevMinSUL           Q-RxLevMin                      OPTIONAL,   -- Need R
    q-QualMin               Q-QualMin                       OPTIONAL,   -- Need R,
    p-Max           P-Max                                   OPTIONAL,   -- Need R
    t-ReselectionNR         T-Reselection,
    t-ReselectionNR-SF      SpeedStateScaleFactors OPTIONAL,            -- Need N
```

TABLE 1-continued

```
threshX-HighP                   ReselectionThreshold,
threshX-LowP                    ReselectionThreshold,
threshX-Q                       SEQUENCE {
    threshX-HighQ                   ReselectionThresholdQ,
    threshX-LowQ                    ReselectionThresholdQ
}
                                                        OPTIONAL, --
Cond RSRQ
    cellReselectionPriority     CellReselectionPriority    OPTIONAL,    -- Need R
    cellReselectionSubPriority  CellReselectionSubPriority OPTIONAL,    -- Need R
    q-OffsetFreq                Q-OffsetRange                      DEFAULT dB0,
    interFreqNeighCellList      InterFreqNeighCellList     OPTIONAL,    -- Need R
    interFreqBlackCellList      InterFreqBlackCellList     OPTIONAL,    -- Need R
    ...
}
InterFreqNeighCellList ::=      SEQUENCE (SIZE (1..maxCellInter)) OF InterFreqNeighCel-
lInfo
InterFreqNeighCellInfo ::=      SEQUENCE {
    physCellId                      PhysCellId,
    q-OffsetCell                    Q-OffsetRange,
        q-RxLevMinOffsetCell            INTEGER (1..8)     OPTIONAL,    -- Need R
        q-RxLevMinOffsetCellSUL         INTEGER (1..8)     OPTIONAL,    -- Need R
    q-QualMinOffsetCell             INTEGER (1..8)     OPTIONAL,    -- Need R
    ...
}
InterFreqBlackCellList ::=      SEQUENCE (SIZE (1..maxCellBlack)) OF PCI-Range
-- TAG-SIB4-STOP
-- ASN1STOP
```

If the network broadcast TAC and the value does not equal to the TAC mapped from the camped geographical area, UE can ignore the broadcast TAC, and consider the cell as barred or use the broadcast TAC to derive TAI and determine whether to trigger Mobility Registration Update procedure.

Method 1:

No TAC is broadcast in system information. UE derives TAI based on the TAC mapped from the geographical area in which the UE tries to camp and broadcast PLMN ID.

Implementation Example 1

No TAC is broadcast in system information. The broadcast system information indicates that geographical position TAC management is applied, UE derives the TAI based on the TAC mapped from the geographical area in which the UE tries to camp and the broadcast PLMN ID to determine whether to trigger Mobility Registration Update procedure.

Method 2:

A TAC is broadcast in system information. UE ignores the broadcast TAC and derives TAI based on the TAC mapped from the geographical area in which the UE tries to camp and broadcast PLMN ID.

Implementation Example 2

When a TAC is broadcast in system information and the broadcast system information indicates that geographical position TAC management is applied, UE ignores the broadcast TAC and derives the TAI based on the TAC mapped from the geographical area in which the UE tries to camp and the broadcast PLMN ID to determine whether to trigger Mobility Registration Update procedure.

Method 3:

A TAC is broadcast in system information. If the broadcast TAC value is different from the TAC mapped from geographical area, UE considers the cell as barred.

Implementation Example 3

When a TAC is broadcast in system information and the broadcast system information indicates that geographical position TAC management is applied, UE considers the cell as barred if the broadcast TAC value is different from the TAC mapped from geographical area ignores the broadcast TAC. No services is available for UE.

Method 4:

A TAC is broadcast in system information. If the broadcast TAC value is different from the TAC mapped from geographical area, UE use the broadcast TAC to derive TAI and determine whether to trigger Mobility Registration Update procedure.

Implementation Example 4

When a TAC is broadcast in system information and the broadcast system information indicates that geographical position TAC management is applied, UE ignores the TAC mapped from geographical area and derives TAI based on the broadcast PLMN ID and TAC value to determine whether to trigger Mobility Registration Update procedure.

UE derives the TAI based on the TAC mapped from the geographical area in which the UE tries to camp and the broadcast PLMN ID to determine whether to trigger Mobility Registration Update procedure.

Method 1:

UE derives the TAI based on the TAC mapped from the geographical area in which the UE tries to camp and the broadcast PLMN ID. If the If the newly derived TAIs does not belong to the previously received TAI list, UE triggers Mobility Registration Update procedure.

Implementation Example 1

Figure 9:
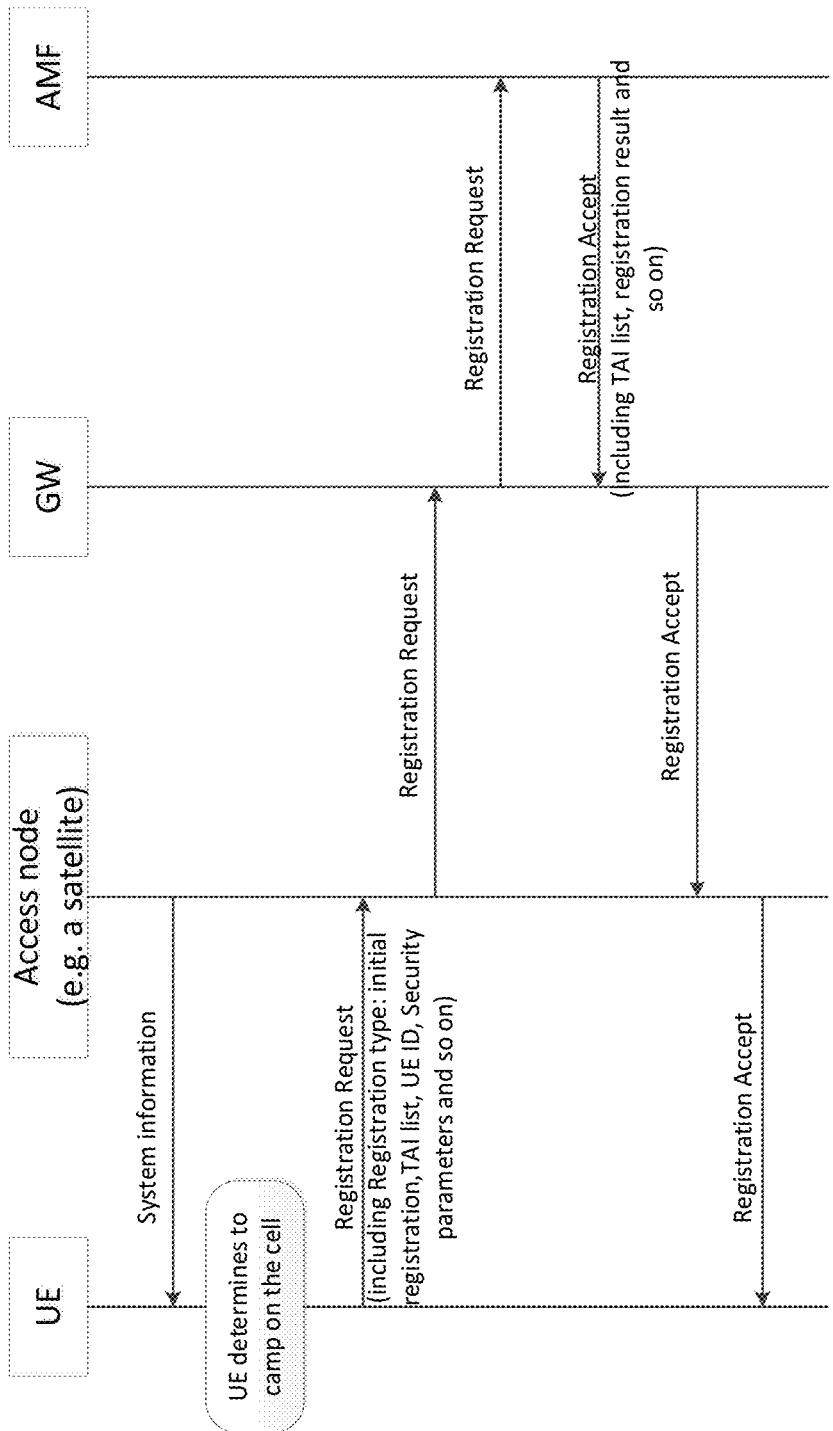
FIG. 9 is a signal exchange diagram for an example method of wireless communication.

As shown in FIG. 9, UE has received system information from the access node. UE sends a Registration Request (including Registration type: initial registration, TAI list, UE ID, security parameters and so on) to the Access node (e.g. a satellite). UE reports the TAI list which identifies the geographical area in which UE can be paged via Registration Request message. The Access node will then forward the message via a gateway GW to the AMF. If AMF accept the registration request from UE, a Registration Accept message (including TAI list, registration result and so on) will be sent to UE to inform the successful registration.

After successful registration procedure, a TAI list which identifies the tracking area confirmed by AMF in which UEs can be reached by paging is kept in UE. When UE moves to a new geographical area, UE derives the TAI with the TAC mapped from geographical area and the broadcast PLMN ID. If the newly derived TAIs does not belong to the previously received TAI list, UE triggers Mobility Registration Update procedure.

Figure 10:
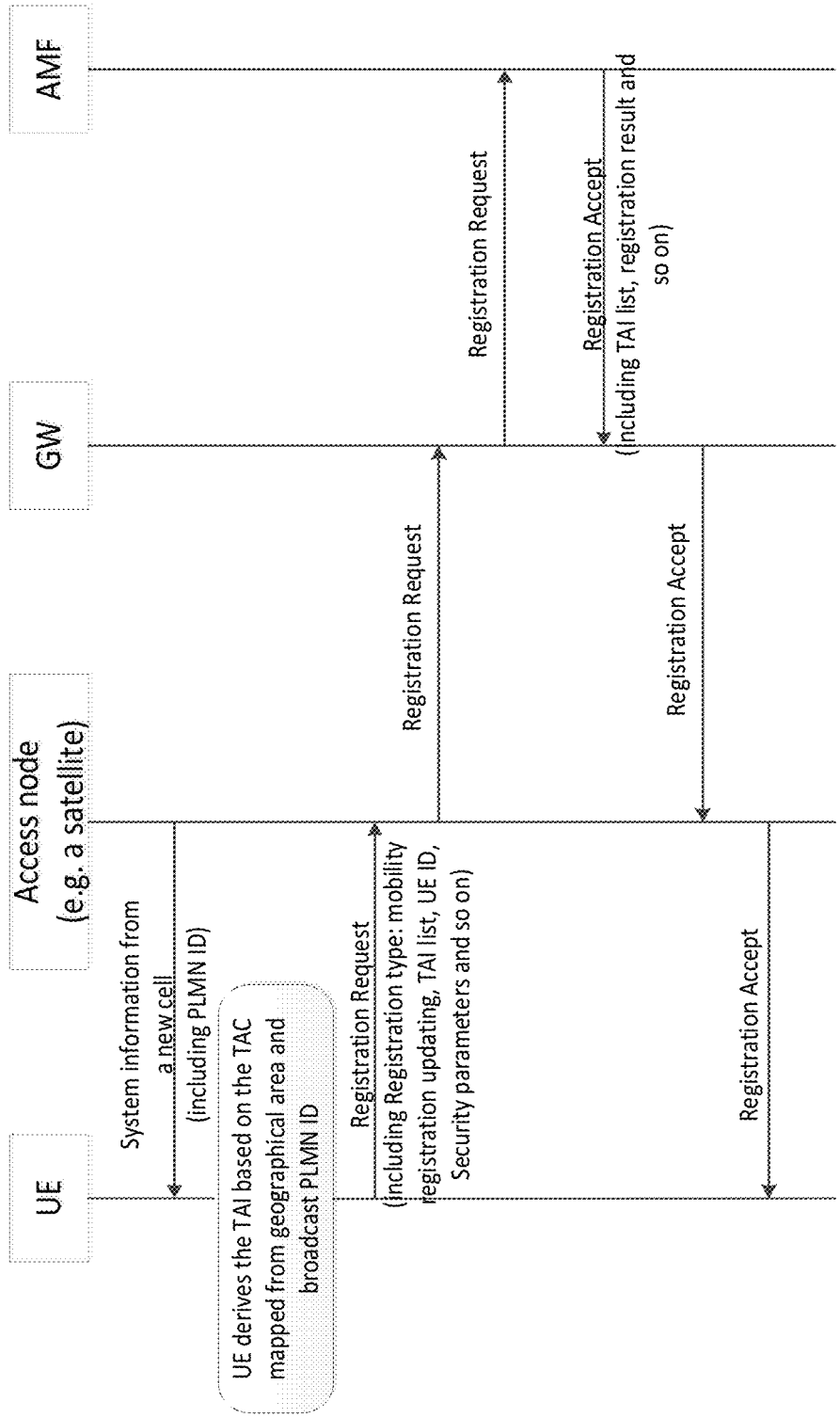
FIG. 10 is a signal exchange diagram for an example method of wireless communication.

As shown in FIG. 10, UE receives system information including PLMN ID from a new cell that may be a satellite cell. UE sends Registration Request (including Registration type:mobility registration updating, TAI list, UE ID, security parameters and so on) to the Access node (e.g. a satellite). UE reports the TAI list which identifies the geographical area in which UE can be paged via Registration Request message. The Access node will then forward the message via a GW to the AMF. If AMF accept the registration request from UE, a Registration Accept message (including updated TAI list, registration result and so on) will be sent to UE to inform the successful registration.

After successful registration procedure, a updated TAI list which identifies the tracking area confirmed by AMF in which UEs can be reached by paging is kept in UE.

The TAI is determined based on geographical positions. An indication is introduced in RRC signaling. The indicator can be included in PLMN info or as a separate IE in system information block 1 (SIB1) or a master information block (MIB) message to indicate the geographical position based TAC management is applied. UE derives the TAI based on the TAC mapped from the geographical area in which the UE tries to camp and the broadcast PLMN ID to determine whether to trigger Mobility Registration Update procedure.

The TAC (Tracking Area Code) field in TAI is derived based on geographical positions. The longitude and latitude of the geographical area within a certain range is mapped to a TAC. As previously described, in some embodiments, one partition of TAC indicates the longitude while another partition indicates the latitude of the geographical area. In some embodiments, the geographical area of the whole earth is partitioned by the longitude and latitude into a lot of lattices. The TAC value indicates the index of a certain lattice. In some embodiments, with the longitude and latitude as inputs, the TAC value can be calculated based on specified formula.

To help with the implementations described in the present document, an indication is introduced in TAI in to indicate a "NTN" system in which the geographical location based TAC management is applied. The indication can be introduced in PLMN ID field or in system information block 1 (SIB1)/master information block (MIB) message directly.

Implicit indication: Specific values of PLMN ID are reserved only for "NTN" system in which the geographical location based TAC management is applied.

Explicit indication: Add a separate IE in a master information block (MIB)/system information block 1 (SIB1) message to indicate a "NTN" system in which the geographical location based TAC management is applied.

If the network broadcast TAC and the value does not equal to the TAC mapped from the camped geographical area, UE can ignore the broadcast TAC, consider the cell as barred or use the broadcast TAC to derive TAI and determine whether to trigger Mobility Registration Update procedure.

In some embodiments, no TAC is broadcast in system information. In such cases, UE derives TAI based on the TAC mapped from the geographical area in which the UE tries to camp and broadcast PLMN ID.

Alternatively, in some embodiments, TAC is broadcast in system information. UE ignores the broadcast TAC and derives TAI based on the TAC mapped from the geographical area in which the UE tries to camp and broadcast PLMN ID.

In some embodiments, TAC is broadcast in system information. If the broadcast TAC value is different from the TAC mapped from geographical area, UE considers the cell as barred.

In some embodiments, TAC is broadcast in system information. If the broadcast TAC value is different from the TAC mapped from geographical area, UE use the broadcast TAC to derive TAI and determine whether to trigger Mobility Registration Update procedure.

In some embodiments, UE derives the TAI based on the TAC mapped from the geographical area in which the UE tries to camp and the broadcast PLMN ID to determine whether to trigger Mobility Registration Update procedure.

In some embodiments, UE derives the TAI based on the TAC mapped from the geographical area in which the UE tries to camp and the broadcast PLMN ID. If the If the newly derived TAIs does not belong to the previously received TAI list, UE triggers Mobility Registration Update procedure.

Figure 11:
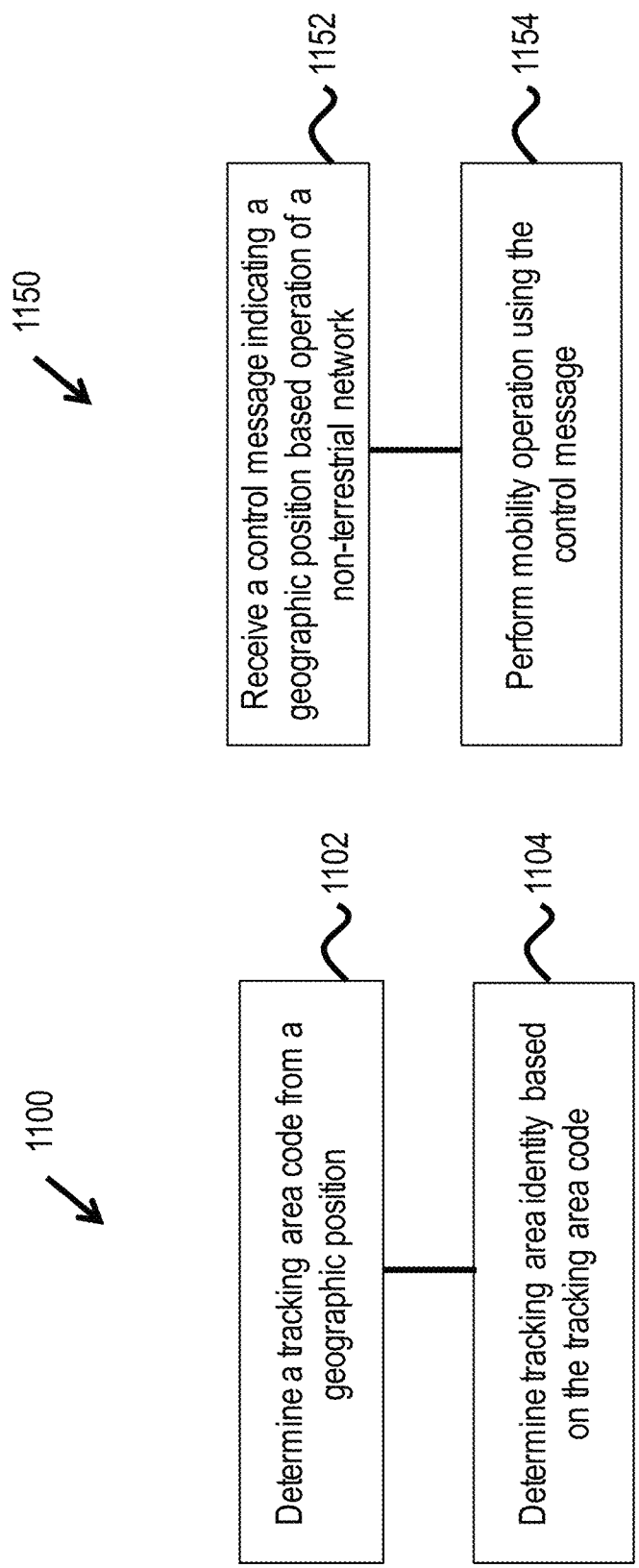
FIG. 11 shows flowchart for example methods of wireless communications performed by a wireless terminal.

FIG. 11 shows a flowchart for an example method 1100 of wireless communication. The method 1100 includes determining (1102), by a wireless terminal, a tracking area code (TAC) from a geographic position of the wireless terminal, and determining (1104) a tracking area identity (TAI) of the wireless terminal based on the tracking area code and an indicator received from a network-side device.

The method 1150 includes receiving (1152), at a wireless terminal, a control message indicating that a non-terrestrial network in which a tracking area identifier is determined by using a tracking area code based on a geographic position of the wireless terminal, and performing (1154) mobility operation based on the control message.

Figure 12:
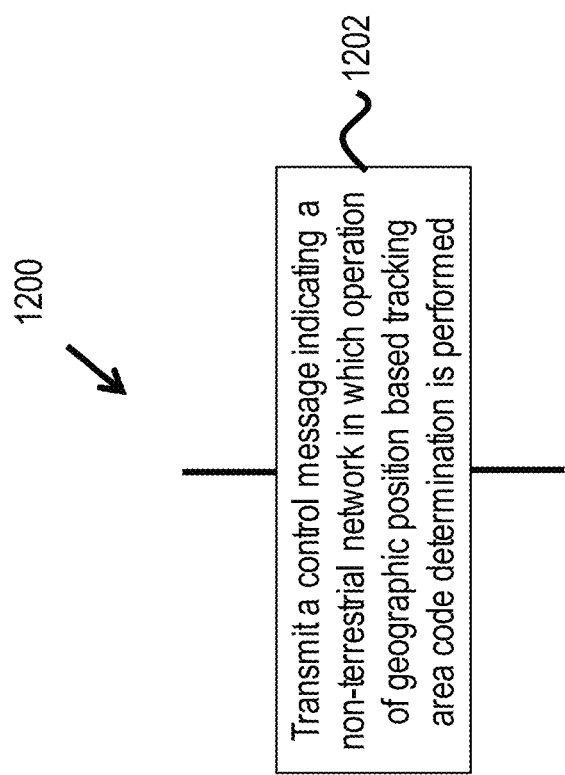
FIG. 12 shows fa flowchart for an example method of wireless communications.

FIG. 12 shows a flowchart for an example method 1200 of wireless communication. The method 1200 includes transmitting (1202), by a network-side device, a control message indicating that an NTN in which a tracking area identifier is determined by using a tracking area code based on a geographic position of a wireless terminal.

Various embodiments of the above-described methods 1100, 1150 and 1200 may further be described using the following clauses.

1. A wireless communication method (e.g., 1100), comprising determining, by a wireless terminal, a tracking area code (TAC) from a geographic position of the wireless terminal; and determining a tracking area identity (TAI) of the wireless terminal based on the tracking area code and an indicator received from a network-side device.

2. The method of clause 1, wherein the indicator is received from a radio resource control (RRC) message.

3. The method of clause 2, wherein the RRC message includes a separate information element for the message as indicator of a non-terrestrial network in which geographical position based TAC management is applied.

4. The method of clause 3, wherein the RRC message is a system information block 1 (SIB1) message.

5. The method of clause 3, wherein the RRC message is a master information block (MIB) message.

5. The method of clause 2, 4 or 5, wherein the RRC message implicitly signals that the TAC is for a non-terrestrial network (NTN) based on a public land mobile network identifier that is reserved for NTN signaling in system information block.

6. The method of clause 1, wherein the determining the tracking area code from the geographic position includes determining the tracking area code as a first portion based on a longitude and a second portion based on a latitude of the geographic position.

7. The method of clause 1, wherein the determining the tracking area code from the geographic position includes determining the tracking area code to be an index to a lattice in a lattice structure wherein the lattice structure covers an entire coverage network.

8. The method of clause 1, wherein the determining the tracking area code from the geographic position includes calculating the tracking area code as a function of latitude and longitude of the geographic position.

9. The method of clause 1 further including determining that the TAC is different from a network broadcast TAC received from the network-side node; and marking a cell of the network-side node as being barred from use.

10. The method of clause 1 further including: determining that the TAC is different from a network broadcast TAC received from the network-side node; and deriving another TAI based on the network broadcast TAC; and determining whether to trigger a mobility registration update procedure based on a value of the another TAI.

11. The method of clause 1, further including: determining, based on the TAC and a broadcast public land mobile network (PLMN) identifier, to trigger a mobility registration update procedure by comparing with a TAI list previously stored by the wireless terminal.

12. A method of wireless communication (e.g., 1200), comprising: transmitting, by a network-side device, a control message indicating that a non-terrestrial network (NTN) in which a tracking area identifier is determined by using a tracking area code based on a geographic position of a wireless terminal.

13. The method of clause 12, further including: receiving a registration request of initial registration type from the wireless terminal, wherein the registration request includes a list of tracking area identifiers that the wireless terminal is configured to operate with; and performing message exchange with other network-side functions to facilitate completion of the registration request from the wireless terminal.

14. The method of clause 12, further including: receiving a registration request of mobility update type from the wireless terminal, wherein the registration request includes a list of tracking area identifiers that the wireless terminal is configured to operate with; and performing message exchange with other network-side functions to facilitate completion of the registration request from the wireless terminal.

15. The method of clause 13 or clause 14, wherein the performing message exchange includes: forwarding the registration request to an access and mobility management function; and receiving a registration accept message from the mobility management function that includes the list of tracking area identifiers.

16. The method of clause 15, wherein the forwarding is performed via a gateway function.

17. A method of wireless communication (e.g., method 1150), comprising: receiving, at a wireless terminal, a control message indicating that a non-terrestrial network in which a tracking area identifier is determined by using a tracking area code based on a geographic position of the wireless terminal; and performing mobility operation based on the control message.

18. The method of clause 12 or clause 17, wherein the control message is carried as an implicit indication via a set of public land mobile network ID values that are reserved for indicating the NTN.

19. The method of clause 12 or clause 17, wherein the control message is a system information block1 (SIB1) message.

20. The method of clause 12 or clause 17, wherein the control message is a master information block (MIB) message.

21. The method of clause 17, wherein the mobility operation includes starting a mobility registration updating procedure based on receiving the control message and determining that a broadcast tracking area identifier received in a broadcast message is different from the tracking area identifier determined by using the tracking area code based on the geographic position of the wireless terminal.

22. The method of clause 17, further including, upon determining that a broadcast tracking area identifier received in a broadcast message is different from the tracking area identifier determined by using the tracking area code based on the geographic position of the wireless terminal, marking the NTN as being barred from accessing by the wireless terminal.

23. A wireless communication apparatus comprising a processor configured to implement a method recited in any one or more of clauses 1 to 22.

24. A computer readable medium having code stored thereon, the code comprising processor-executable instructions to implement a method recited in any one or more of clauses 1 to 22.

Figure 13:
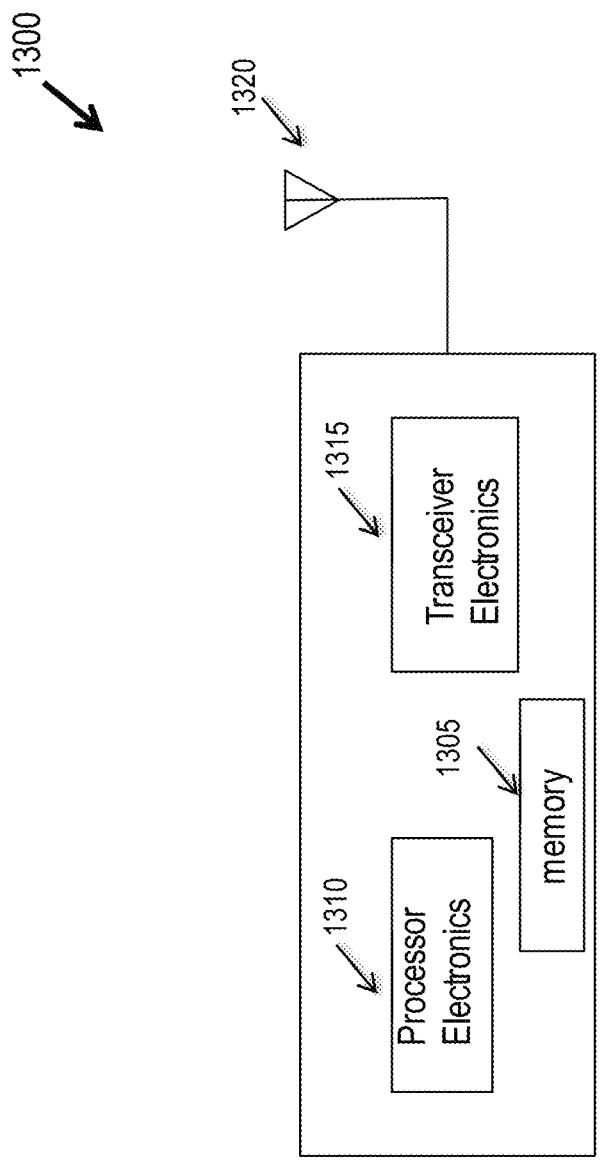
FIG. 13 is a block diagram showing an example embodiment of a wireless communication device.

FIG. 13 depicts a block diagram representing of a portion of a radio station 1305. A radio station 1305 such as a base station or a wireless device (or UE, e.g., terminal 1606) can include processor electronics 1310 such as a microprocessor that implements one or more of the wireless techniques presented in this document. The radio station 1305 can include transceiver electronics 1315 to send and/or receive wireless signals over one or more communication interfaces such as antenna 1320. The radio station 1305 can include other communication interfaces for transmitting and receiving data. Radio station 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the radio station 1305.

It will be appreciated that the present document discloses several techniques and formats by which tracking area code for a wireless terminal may be determined and used based on geographic position of the wireless device. It will further be appreciated that the determination of tracking area code based on geographic position may be controlled via a message from the network-side that indicates whether such a determination is to be performed. Furthermore, the wireless terminal may be able to compare broadcast tracking area identifier with geographic position based tracking area identifier to determine whether a mobility registration update is to be performed and whether a cell is barred from operation by the wireless terminal.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   determining, by a wireless terminal, a tracking area code (TAC) from a geographic position of the wireless terminal; and
   determining a tracking area identity (TAI) of the wireless terminal based on the tracking area code and an indicator received from a network-side device, the indicator indicating that the network-side device corresponds to a non-terrestrial network to which the tracking area code based on the geographic position of the wireless terminal is applied.

2. The method of claim 1, wherein the indicator is acquired from a radio resource control (RRC) message.

3. The method of claim 2, wherein the RRC message includes a separate information element as indicator of the non-terrestrial network in which geographical position based TAC management is applied.

4. The method of claim 3, wherein the RRC message is a system information block 1 (SIB1) message.

5. The method of claim 3, wherein the RRC message is a master information block (MIB) message.

6. The method of claim 2, wherein the RRC message implicitly signals that the TAC is for the non-terrestrial network (NTN) based on a public land mobile network identifier that is reserved for NTN signaling in a system information block.

7. The method of claim 1, wherein the determining the tracking area code from the geographic position includes determining the tracking area code as a first portion based on a longitude and a second portion based on a latitude of the geographic position.

8. The method of claim 1, wherein the determining the tracking area code from the geographic position includes:

determining the tracking area code to be an index to a lattice in a lattice structure wherein the lattice structure covers an entire coverage network.

9. The method of claim 1, wherein the determining the tracking area code from the geographic position includes calculating the tracking area code as a function of latitude and longitude of the geographic position.

10. The method of claim 1 further including:
determining that the TAC is different from a network broadcast TAC received from the network-side device; and
consider a cell of the network-side device as being barred from use.

11. The method of claim 1 further including:
determining that the TAC is different from a network broadcast TAC received from the network-side device;
deriving another TAI based on the network broadcast TAC; and
determining whether to trigger a mobility registration update procedure based on a value of the another TAI.

12. The method of claim 1, further including:
determining, based on the TAC and a broadcast public land mobile network identifier, to trigger a mobility registration update procedure by comparing with a TAI list previously stored by the wireless terminal.

13. A method of wireless communication, comprising:
receiving, at a wireless terminal from a network device, a control message including an indicator indicating that the network device corresponds to a non-terrestrial network in which a tracking area identifier (TAI) is determined by using a tracking area code based on a geographic position of the wireless terminal; and
determining, at the wireless terminal, in response to receiving of the control message including the indicator, whether to trigger a mobility registration update procedure to update a TAI list based on the determined tracking area identifier by using the tracking area code based on the geographic position of the wireless terminal.

14. The method of claim 13, wherein the control message is carried as an implicit indication via a set of public land mobile network ID values that are reserved for indicating the non-terrestrial network.

15. The method of claim 13, wherein the control message is a system information block1 (SIB1) message.

16. The method of claim 13, wherein the control message is a master information block (MIB) message.

17. The method of claim 13, further comprising: determining that a broadcast tracking area identifier received in a broadcast message is different from the tracking area identifier determined by using the tracking area code based on the geographic position of the wireless terminal.

18. The method of claim 13, further including, upon determining that a broadcast tracking area identifier received in a broadcast message is different from the tracking area identifier determined by using the tracking area code based on the geographic position of the wireless terminal, marking the non-terrestrial network as being barred from accessing by the wireless terminal.

19. A wireless communication apparatus comprising a processor configured to implement a method comprising:
determining a tracking area code (TAC) from a geographic position of a wireless terminal; and
determining a tracking area identity (TAI) of the wireless terminal based on the tracking area code and an indicator received from a network-side device, the indicator indicating that the network-side device corresponds to a non-terrestrial network to which the tracking area code based on the geographic position of the wireless terminal is applied.

20. A wireless communication apparatus comprising a processor configured to implement a method comprising:
receiving, at a wireless terminal from a network device, a control message including an indicator indicating that the network device corresponds to a non-terrestrial network in which a tracking area identifier (TAI) is determined by using a tracking area code based on a geographic position of the wireless terminal; and
determining, at the wireless terminal, in response to receiving of the control message including the indicator, whether to trigger a mobility registration update procedure to update a TAI list based on the determined tracking area identifier by using the tracking area code based on the geographic position of the wireless terminal.

* * * * *

UNITED STATES PATENT AND TRADEMARK OFFICE
CERTIFICATE OF CORRECTION

PATENT NO. : 11,930,475 B2
APPLICATION NO. : 17/211531
DATED : March 12, 2024
INVENTOR(S) : Yuan Gao et al.

Page 1 of 1

It is certified that error appears in the above-identified patent and that said Letters Patent is hereby corrected as shown below:

In the Drawings
In Fig. 6, Sheet 6 of 14, delete "Latitudez:" and insert --Latitude:--, therefor.
In Fig. 7, Sheet 7 of 14, delete "Latitudez:" and insert --Latitude:--, therefor.
In Fig. 7, Sheet 7 of 14, delete "Latitudez: 0°" and insert --Latitude: 0°--, therefor.

In the Claims
In Column 18, Line 2, in Claim 15, delete "block1" and insert --block 1--, therefor.

Signed and Sealed this
Eleventh Day of June, 2024

Katherine Kelly Vidal
*Director of the United States Patent and Trademark Office*